INVENTORS
GEORGES GABRIEL MOZZANINI
VICTOR PAUL LEBERTRE
BY
George N. Corey
ATTORNEY INVENTORS
GEORGES GABRIEL MOZZANINI
VICTOR PAUL LEBERTRE
BY
George H. Corey
ATTORNEY Patented Jan. 30, 1951

2,539,791

UNITED STATES PATENT OFFICE 2,539,791

APPARATUS FOR CONTROL OF THE SPEED OF DIRECT-CURRENT MOTORS

Georges Gabriel Mozzanini and Victor Paul Lebertre, Neuilly-sur-Seine, France

Application November 15, 1946, Serial No. 709,922
In France June 24, 1941

15 Claims. (Cl. 318—92)

This invention relates to direct current motors and particularly to means for controlling the speed of such motors over a wide range such as is desirable in operating machine tools, for instance.

In the operation of direct current motors it is well known to secure variation of the speed thereof by varying the shunt field excitation. This method of speed variation has the advantage of simplicity and of direct control of the speed of the motor. When such a motor is used to operate a machine tool or other machine in which a variable amount of power is required the amount of power available is limited to that of the single motor. In order to secure variation of the speed and at the same time to provide the requisite variations of the power or of the torque required by the machine tool for effective operation thereof, a Leonard unit has been utilized for such machine tool drive. The Leonard unit necessitates the installation of at least three dynamo electric machines, that is, the generator, the motor for driving the generator and the motor for driving the load, these machines each requiring control apparatus including means to vary the field excitation thereof. The Leonard unit has the advantage, however, that the range of speeds obtainable is wider, namely, in the ratio of 1 to 10 than the ratio of 1 to 4 practically obtainable for a single motor in which the shunt field is varied. To secure variation in the speed it also has been proposed to connect direct current motors first in series and then in parallel to increase the speed and the reverse to decrease the speed. Direct current motors with shunt field excitation, however, when connected in parallel are unstable in the sense that one or the other of these motors may tend to take more than its proper share of the load while the others take less of the load than they should so that one or more of the motors may become overloaded and the others underloaded.

It is an object of the invention to provide a motor drive and a control system particularly adaptable for driving machine tools in which the advantages of shunt field control to secure speed variation are retained and the range of speed variation of the Leonard unit is approached or is exceeded depending upon the number of motors utilized.

It is a further object of the invention to provide means for varying the speed of the motors utilized while automatically securing stable operation thereof.

It is a particular object of the invention to provide means for controlling the operation of a plurality of motors utilized for driving a machine tool so as to secure stable operation of these motors while effecting the desired variations in the speed thereof under varying load conditions as required for operation of the machine tool.

It is an additional object of the invention to provide a motor drive for a machine tool capable of operation over a wide range of speeds and provided with control means capable of operation in a simple manner to effect increase or decrease in the speed as well as to effect operation of the machine tool at any selected speed, while securing automatically stable operation of the motors at any selected speed.

To secure the desired wide range of speeds a plurality of motors are provided, preferably two or four motors each having a power capacity equal to one-half or one-quarter respectively of the total power required to be supplied by these motors. Although these motors may be operatively connected in any suitable manner to the machine to be driven, for example, to a machine tool, preferably the two motors, or the four motors as the case may be, are mechanically connected for rotation together at the same speed and may be arranged with their rotors on a common shaft. The shunt fields of these motors may be connected in parallel to a suitable supply, which may be the main power supply line or may be separate from the main power line for the motors, but preferably are connected in series to such separate supply or to the main supply. Variation of the shunt field, therefore, is effective to vary the speed of the motors either individually, when the shunt fields are connected in parallel to the supply, or in common when the shunt fields are connected in series so as to carry the same field current in all of the shunt fields. Since it is desirable that the motors so far as possible shall have identical characteristics the shunt field windings usually are designed to produce the same excitation for each motor and the number of ampere turns are designed to be the same in each field winding. In order, so far as possible, to take care of the unavoidable differences in the construction, in the magnetic characteristics of the field pieces and of the armatures and the differences in the resistances of the windings and other characteristics of the armature and of the windings compensating resistances may be used for each field coil in the conventional manner. By connecting the shunt fields in series the differences in the amperes flowing through the fields of the different motors are avoided and the design and compensation as well as the control of the speed thereby are simplified.

In order to secure sufficient variation in the speed, means supplemental to that which produces variations in the shunt field are utilized to connect the motors successively first in series and then in parallel when two motors are used, in order to increase the speed and in reverse order to decrease the speed. When four motors are used the motors are connected first in series, then in series-parallel and then in parallel. In this manner variation of the speed is secured theoretically in the ratio of 1 to 8 and practically in the ratio of 1 to 7 for two motors mechanically and electrically connected as above mentioned. When four motors are utilized mechanically and electrically connected as above described the range of speed may be theoretically in the ratio of 1 to 16, practically 1 to 15. By thus connecting the motors first in series and then in parallel, or in case of four motors, utilizing an intermediate connection in series-parallel, it will be understood that the speed of the motors operating in each zone of the range of speed secured respectively by the series, the series-parallel, and the parallel connections, as the case may be, may be further modified by variation of the shunt field current to vary the excitation while the motors are operating in the respective zones. As will be described hereafter the invention provides particular means for accomplishing such connection of the motors as well as for variation of shunt fields thereof.

In order to take care of lack of stability of operation of the several motors when connected in parallel or in series-parallel which is caused by differences in the characteristics thereof even though of the same design, as disclosed in our copending application, Serial No. 439,320, filed April 17, 1942, now abandoned, of which this present application is a continuation in part, the several motors of the groups consisting of two motors or of four motors are each provided with a series field. Thus, the individual motors utilized in the invention have the fundamental characteristics of a compound wound motor and in some embodiments of the invention may operate as compound motors.

When the shunt field excitation of the respective motors connected in parallel is varied over a wide range to secure the greatest possible variation of the speed of these motors by this means, one or the other of the motors may tend to take more of the load than the other as above mentioned. To compensate for this tendency we utilize auxiliary series field coils. These field coils are so wound in relation to the main series field coils that the flux produced thereby opposes that produced by the main series field coil. In the discussion to follow the main series field coil or the flux produced thereby will be referred to as "additive" and the auxiliary field coil and the flux produced thereby will be referred to as "subtractive." One or more of the subtractive field coils in one motor are connected in series with an additive field coil of another motor. When the motors, either two or four, are connected in series the subtractive coils carried by the several motors are connected in series with each other and in series with the additive coils of all the other motors, these additive coils being connected in series in view of the series connection of the motors. When the motors are connected in parallel the subtractive coil of a given motor also is connected in series with the additive coil of another motor but is connected in parallel with the additive coil of the given motor and the subtractive coil of the second motor.

The number of ampere turns respectively provided in the additive and subtractive coils of each of the motors connected in parallel may be such, when the motors are of the same design and so far as possible of the same characteristics, that the flux produced by the subtractive coil is equal and opposite to the flux produced by the additive coil when the load is equally distributed between the motors. Thus, each motor when carrying the same, or substantially the same, armature current as the others may have the series field thereof neutralized by the subtractive flux and each motor then may operate substantially as a shunt field motor. If, when two motors thus are connected in parallel, because of the differences in construction or electrical and magnetic characteristics of the motors or because of differences in the excitation of the shunt field however produced, a given motor tends to take more of the load than the other, the additional current drawn through the armature and the series field of the given motor carrying the greater load increases the subtractive flux in the other motor. This weakens the field, that is, the series field flux of this other motor, thereby tending to increase the speed thereof to cause it to take additional load. The corresponding increase of the series field excitation of the given motor carrying the greater load concomitantly with the reduction of the subtractive field of this motor due to the reduced current of the other motor carrying less load tends to reduce the speed of the given motor and thereby to reduce the load which it tends to carry until the balancing of the loads is restored.

Where four motors are used for the driving system the conditions of operation just described apply to the two groups of motors each having two motors connected in series, which groups are connected in parallel, so that stability of the two groups with respect to each other is maintained by the counteracting effect of the subtractive windings and fluxes in the respective motors on the additive flux produced by the series field in the same motor.

It is a particular feature of the invention that the control means above referred to is capable of effecting variation of the excitation due to the shunt fields, preferably connected in series as above stated, in each of the plurality of zones of operation in bringing the motors, the armatures of which preferably are mounted on a common shaft or otherwise mechanically connected to rotate together, up to the maximum desired speed from starting. The control device is constructed with switching means for successively connecting the motors for operating in these zones as above described and with rheostat means for controlling the shunt field current through a range effective to vary the speed to the desired degree during operation of the motors in each zone, the switching means effecting the reconnection of the motors for the next zone when the rheostat has been fully operated to vary the field excitation through such range. Upon starting the motors the switch means is effective to connect the motors in series and the rheostat then is gradually cut in to reduce the shunt field current. Continued operation of the control device effects operation of the rheostat through the effective range to bring the speed of the motors up to a predetermined speed and when the limit of such range is reached then effects operation of the switching means to change the connection of the motors for operation in parallel, if two motors are used. In the specific example shown, the speed of the motors is brought from the minimum speed $V_1$ to a speed $V_2$ which is double the minimum speed. This operation of the switching means occurs concomitantly or simultaneously with cutting out preferably all or substantially all of the resistance of the rheostat substantially to restore the full shunt field excitation. Upon continued operation of the control device the rheostat is again operated to cut in the resistance over this effective range or over a different selected range to increase the speed of the motors in this zone of parallel connection to the maximum desired speed.

When four motors are used the control device similarly operates the switching means first to connect the motors in series and the rheostat to increase the speed in this first zone of operation, for example, from a minimum speed $V_1$ to a speed $V_2$ which is double the minimum speed. Upon reaching the desired speed by such operation of the rheostat the switching means is effective to connect the motors in series-parallel and concomitantly the control device reconnects the rheostat to produce substantially the full shunt field excitation. Continued operation of the control device reduces the shunt field excitation through the same effective range or through a different selected range to vary the speed of the motors in the second zone, for example, from a speed $V_2$ to a speed $V_3$ such as $V_3=2V_2$. Upon reaching the limit of shunt field control in this second zone the rheostat is effective again substantially to restore the full shunt field excitation and concomitantly to operate the switching means to change the connection of the motors from series-parallel to parallel. Further operation of the control device is effective to operate the rheostat to increase the speed of the motors from the attained speed $V_3$ to any degree consistent with the mechanical and electrical construction thereof.

It will be apparent from the description above given that a wide range of speeds may be obtained. Ordinarily in the operation of machine tools sufficient variation is secured by the use of either two motors or four motors, the number of motors used, however, depending upon the total amount of power required and the necessity for securing a sufficient number of steps to secure gradual variation of the speed over the desired range, having regard also to the differences in the characteristics of the different motors. Since, as is well known, two motors of the same size and characteristics operating under the same load, for example full load, can so operate only with the same shunt field excitation, the motors will only operate at one speed determined by this excitation. When the motors are connected on a common shaft variation of the shunt field excitation to secure variation of the speed develops the condition, when a wide variation in the speed is attempted, that one or the other of the motors becomes overloaded and the other underloaded because of the differences in their characteristics. As it is desirable or necessary to distribute the load equally between the motors or in proportion to the rated power of the motors the variation of the speed by varying the shunt field excitation, therefore, is limited. With a larger number of motors such a limited variation of the shunt field may be utilized for each of the zones of operation in bringing the motors up to the desired speed by connecting the motors first in series and then in parallel in the case of two motors or in series, in series-parallel and then in parallel with four motors. In each of these steps of control the balancing of the load between the motors is secured by means of the subtractive coils which function as above described. Instead, however, of constructing these subtractive coils so as to fully counteract the additive flux of the series field, the subtractive coils may have sufficient turns so that a part only of this additive flux is counteracted, so that the motors retain the characteristics of a compound wound motor throughout the range of speeds.

The subtractive coils may be wound in part upon the north pole and in part upon the south pole upon which respectively the sections of the series or additive windings are wound, so that the flux produced by each section of the series winding is opposed by the flux produced by the respective part of the subtractive winding. In some cases it is advantageous, however, to wind the additive winding upon the north pole and the subtractive winding upon the south pole or the additive winding may be wound upon the south pole and the subtractive winding upon the north pole. This construction has the advantage of reducing the number of separate coils which are carried upon each pole piece and serves to simplify the connections between the coils, particularly those carrying the full current through the series field. Other arrangements of these coils may be made to provide the requisite compensation to prevent unbalancing of the load on the motors.

The invention will be further understood from the description of the drawings to follow, in which.

Figure 1:
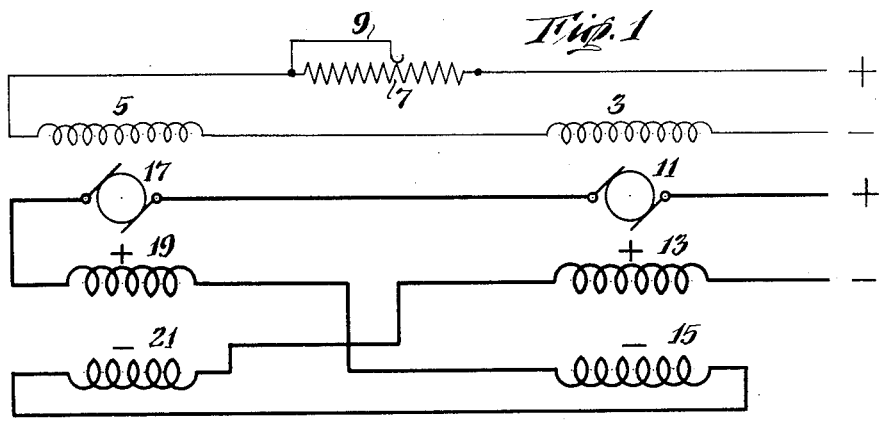
Fig. 1 shows a wiring diagram of two motors connected in series with their shunt fields connected in series and having additive and subtractive windings.

Fig. 1 shows a wiring diagram of two direct current motors connected in series and provided with additive and subtractive coils in accordance with the invention. The shunt field windings 3 and 5 of the motors having respectively armatures 11 and 17 are connected in series to a supply through the variable resistance or rheostat 7 having a movable contact 9. The series field or additive 13 winding of the motor 11 is connected in series with the subtractive winding 21 of the motor 17, the flux produced by this subtractive winding opposing the flux produced by the series field 19 of the motor field 17. The series field 19 is connected in series with the subtractive winding 15 of the motor 11. It will be apparent that the current from the supply flows in series through the two armatures and through the respective additive and subtractive windings. If the turns of the winding 13 and of the winding 15 are equal the motor 11 will operate substantially as the shunt motor. Correspondingly, if the turns of the subtractive winding 21 are equal to the turns of the additive winding 18 of the motor 17 this motor will operate substantially as a shunt motor. Since the armatures and the additive and subtractive field winding are all in series in this method of connection, it is sufficient to secure the desired compensation that the number of turns in the additive and subtractive coils of the same motor shall be substantially equal. As the shunt field windings 3 and 5 are connected in series and, therefore, traversed by the same current the motors will operate in stable operation when the field is varied by means of the rheostat 7 and its movable contact 9. Any increase in the load applied to one motor, for example the motor 11, will result in an increased current through the additive winding 13 of that motor and through the subtractive winding 21 of the motor 17, as well as through the additive winding 19 and through the subtractive winding 15. The field fluxes produced by the additive and subtractive windings on each motor, therefore, tend to neutralize each other and to maintain the excitation of the shunt field, thus to accomplish variation in the speed substantially under the control of the rheostat 7.

Figure 2:
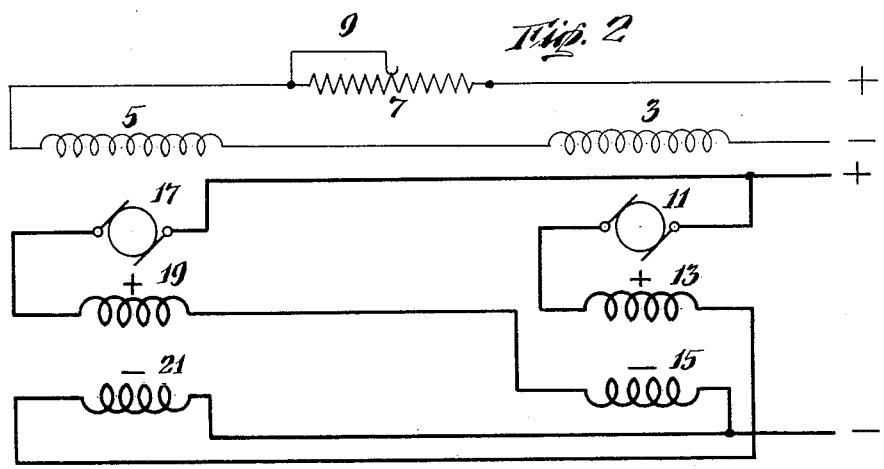
Fig. 2 shows a wiring diagram of two motors connected in parallel with their shunt fields connected in series and having additive and subtractive windings.

In Fig. 2 the shunt fields and armatures and the additive and subtractive windings are identified with the same numerals as the corresponding elements in Fig. 1. The armatures of the two motors in this arrangement, however, are connected in parallel to the supply, the shunt fields 3 and 5 remaining, as in Fig. 1, connected to the supply in series through the rheostat 7. The additive windings 13 and 19 of the respective motors in Fig. 2 are connected in series with their armatures and in series respectively with the subtractive windings 21 and 15 of the motors. Thus the current drawn by the armature 11 passes through the additive winding 13 of the motor 11 and the subtractive winding 21 of the motor 17. In parallel with this current the current flows through the armature and the additive winding 19 of the motor 17 and through the subtractive winding 15 of the motor 11. Increase in the current drawn through the motor 11, for example, increases the ampere turns of the additive winding 13 and the ampere turns of the subtractive winding 21. With the same current flowing through the armature 17 and its additive winding 19 and through the subtractive winding 15 of the motor 11 the increased flux produced by the subtractive winding 21 is effective to reduce that produced by the additive winding thereby to weaken the field of the motor 17, the shunt fields 3 and 5 being constant. The motor 17, therefore, will tend to speed up and, correspondingly, because of the increased excitation due to the additive field 13, the field flux of the motor 11 will be increased and its speed will tend to be reduced. The distribution of the load between the two motors 11 and 17, therefore, will be restored when the excitation produced by the additive and subtractive windings produces the requisite fluxes in the fields which in cooperation with that produced by the shunt windings 3 and 5 corresponds to the loads and speeds at which these motors are designed to operate.

Figure 3:
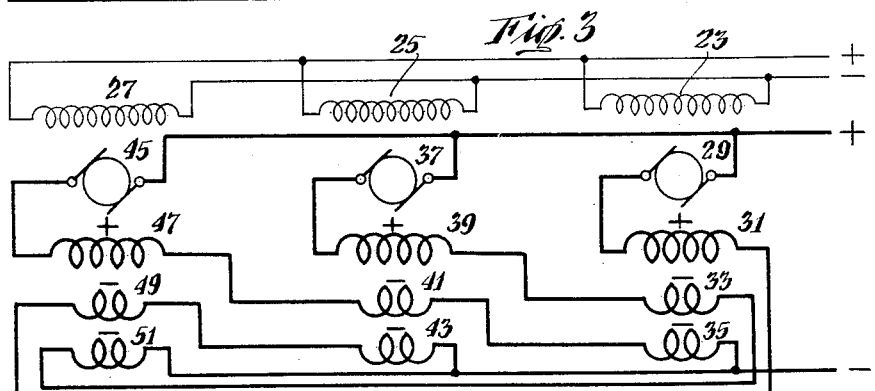
Fig. 3 shows a wiring diagram of three motors connected in parallel having their shunt fields connected in parallel, the motors being provided with additive and subtractive windings.

In Fig. 3 is shown a system of three motors arranged in parallel and provided with additive and subtractive windings for compensation of the fields to maintain stability. In Fig. 3 the shunt fields 23, 25 and 27 are connected in parallel to a supply. Each of these fields may be provided with a separate rheostat, not shown, for control of the shunt field excitation respectively of the motors 29, 37 and 45. The motor 29 is provided with a series or additive field winding 31 and two subtractive windings 33, 35. Similarly the motor 37 is provided with additive winding 39 and subtractive windings 41 and 43 and motor 45 is provided with additive winding 47 and subtractive windings 49 and 51. It will be apparent from inspection of Fig. 3 that, in series with the additive winding, for example the additive winding 31 of the motor 29, and in series with the armature of this motor, subtractive windings 49 and 43 respectively of the other two motors are connected to a supply. The additive winding 39 in series with the armature of the motor 37 is connected in series with the subtractive windings 33 and 51 respectively of the motors 29 and 45. The additive winding 47 of the motor 45 is connected in series with the subtractive windings 41 and 35 respectively of the motors 37 and 29. The action of compensating for unbalancing the load in this arrangement is similar to that described in connection with Fig. 2. When one motor, for example, the motor 29 tends to take more load and, therefore, draws more current through its armature and its series field or additive winding 31, more current also is drawn through the subtractive windings 49 and 43 of the other two motors 45 and 37. The increase in flux due to the increased current in these subtractive windings reduces the effective fluxes due to the series fields 39 and 47 of the motors 37 and 45, thereby causing the motors 37 and 45 to increase in speed correspondingly to increase their share of the load. The increase in the current and, therefore, of the flux due to the additive winding 31 of the motor 29, tends to decrease the speed of the motor 29 and thereby to reduce its share of the load. This action continues until the balance between the loads is restored.

Figure 4:
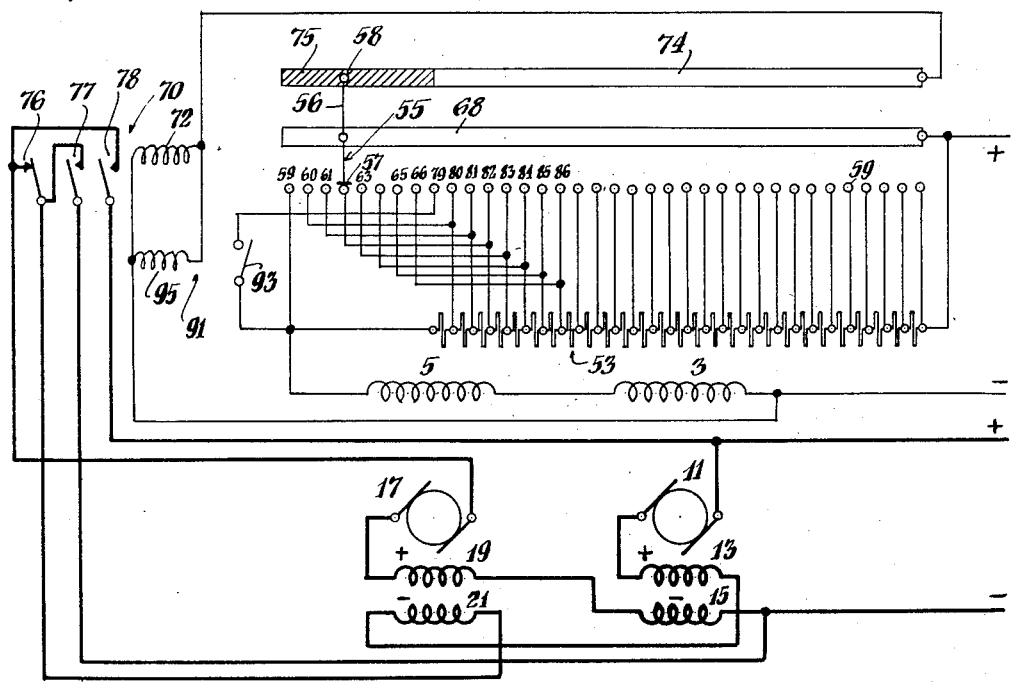
Fig. 4 shows a wiring diagram of two motors connectible in series or parallel and the control means therefor.

In Fig. 4 is shown a wiring diagram and a control device for a pair of motors 11 and 17 which provides for connection of the motor in series, as in Fig. 1, or in parallel, as in Fig. 2, and for control of the speed of the motors to operate in two zones of speed and for varying the speed in each zone. In Fig. 4 the shunt fields 3 and 5 of the motors 11 and 17 are shown connected in series to a supply through control means hereafter described. In this figure the series or additive windings 13 and 19 respectively of the motors 11 and 17 are connected in series with the respective armatures of these motors and in series respectively with the subtractive windings 21 and 15 of the other motor. It will be apparent, therefore, that if the motors 11 and 17 are connected in series with the current flowing in series through the armatures of these motors and through the additive and the subtractive windings in the manner above described, the control of speed by variation of the shunt field current may be accomplished and stability of the operation secured in the same general manner as described in connection with Fig. 1. When these motors are connected in parallel the additive and subtractive fields will be effective to secure stability of operation of the motors in the same manner as described in connection with Fig. 2 when the speed is varied by variation of the shunt field. The speed of the motors, which preferably have their armatures mechanically connected for rotation together or are mounted on a common shaft, is controlled by means of the control device about to be described which includes a rheostat for controlling the current flowing through the shunt field windings 3 and 5 and switching means concomitantly operated with the rheostat to connect the motors in series and in parallel.

In Fig. 4 the control apparatus diagrammatically shown comprises a movable member or slidable contact element 55 having a wiping shoe 57 designed to make contact with the successive contact points of the rheostat, the shoe 57 being proportioned to bridge from one contact to the other but to engage only one contact when in register therewith. The contact 59 may be designated as the first contact of a set or group of auxiliary contacts 59 to 66 inclusive in the embodiment shown in Fig. 4. The contact 59 is connected directly to one terminal of the shunt field 5, one terminal of the grid 53 of the rheostat also being connected to this terminal of the shunt field 5. The successive contacts 60 to 66 inclusive progressing toward the right in Fig. 4 are connected by suitable leads to the joined terminals of adjacent sections of the grid 53 of the rheostat.

To these joined terminals also are connected respectively in parallel with the auxiliary contacts 59 to 66 inclusive the contacts of a group of contacts 79 to 86 inclusive of the rheostat which for the purpose of distinction may be referred to as the ancillary contacts of the rheostat. The group of auxiliary contacts is arranged in relation to the ancillary contacts so that the movable member or slidable contact element 55 of the rheostat may be moved in succession in relation to these groups to move the shoe 57 successively over the contacts 59 to 66 inclusive of the auxiliary group and then over the contacts 79 to 86 inclusive of the ancillary group when the movable member is moved in one direction, toward the right in Fig. 4, and to move the shoe reversely in succession over the ancillary contacts and auxiliary contacts when the movable member is moved in the reverse direction, that is, toward the left in Fig. 4.

The contact element 55 is constructed to bear upon and slide along a conductor bar 68 arranged in parallel relation to the aligned contacts of the two groups of contacts of the rheostat, the right hand end of the bar 68 being connected to one side of the supply. The opposite terminal of the shunt field 2 in series with the shunt field 5 is connected to the other side of this supply. It will be apparent, therefore, as the slide element 55 is moved toward the right in Fig. 4 the shoe 57 successively engages contacts 59 to 66 inclusive of the auxiliary group and then engages ancillary contacts 79 to 86 inclusive and thereafter may engage others of the contacts of the rheostat. Resistance of the grid 53 thereby will be cut in series in with the shunt fields 3 and 5 to reduce the excitation of both motors 11 and 17 to increase the speed of the motors through an effective range of speed as determined by the characteristics of the motors in consideration of the load to be carried thereby.

During the operation of the rheostat to move the slide element 55 from the auxiliary contact 59 to the auxiliary contact 66 the motors 11 and 17 will be connected in series. This is accomplished by means of a relay 70 having its coil 72 connected through an auxiliary conductor bar 74 to the supply to which the shunt fields are connected, the slide element 55 having an extension 56 the contact shoe 58 of which is adapted to bear on the bar 74 as the element 55 moves along the rheostat. In line with the conductor bar 74 is a bar 75 of insulating material upon which the contact shoe 58 of the extension 56 may bear during the operation of the rheostat to move the slide element over the auxiliary rheostat contacts 59—66. During this portion of the movement of the slide element 55 no current will flow through the conductor bar 74 to the coil 72 of the relay 70. The back contact 76 of this relay, therefore, is closed and contacts 77 and 78 thereof are open. A consideration of the circuits in Fig. 4 will show that under these conditions the current in the main supply to the motors 11 and 17 will flow in series through the armature 11, the additive coil 13, subtractive coil 21 of the motor 17, back contact 76, armature 17, additive coil 19 of the motor 17 and subtractive coil 15 of the motor 11. The motors 11 and 17 thus will operate in series and the speed thereof will be controlled by the position of the slidable contact element 55 with its wiping shoe in contact with one or another of the auxiliary contacts 59 to 66 of this position of the rheostat.

The joint between the insulating bar 75 and conductor bar 74 in the arrangement shown in Fig. 4 is located adjacent to the space between the last auxiliary contact 66 and the first ancillary contact 79 of the rheostat, this contact 79 being connected through the contact 93 of a relay 91 the coil 95 of which is connected in parallel with the coil 72 of relay 70 to the conductor bar 74. As shoe 57 of the slide element 55 bridges from the auxiliary contact 66 to the ancillary contact 79 the resistance which has been cut in by operation of the slide element in engagement with the auxiliary contacts 59—66 immediately will be short circuited as soon as the contact 93 of the relay 91 is closed in the following manner. The arrangement of the contacts 66 and 79 with respect to the joint between the conductor bar 74 and the insulating bar 75 is such that as the wiping shoe 57 is about to leave the auxiliary contact 66 the contact shoe 58 comes into contact with the conductor bar 74, causing the current to flow through the slide bar 68, the extension 56 of the slide element 55, the shoe 58, the slide bar 74 and the coil 95 of the relay 91. This energizes the relay 91 to effect closing of the contact 93 to short circuit all of the sections of the grid of the rheostat and therefore all those which are connected to the contacts 60—66 inclusive. Upon engagement of the ancillary contact 79 by the wiping shoe 57 the full field current therefore is restored to the shunt fields 3 and 5 with the consequent tendency to reduce the speed of the motors 11 and 17 were it not for concomitant change which is effected in the connection of these motors. It will be apparent that as the coil 72 of the relay 70 is in parallel with the coil 95 of relay 91 the coil 72 also will be energized and front contacts 77 and 78 of the relay 70 will be closed and concomitantly therewith the back contact 76 of this relay will be opened. These contacts are so connected in the circuit to the armatures that the motors thereby will be connected in parallel and the speed of the motors will increase. Inspection of Fig. 4 will show this circuit is completed through the armature 11, the additive field 13 of the motor 11, the subtractive field 21 of the motor 17, and the front contact 77 of the relay 70. The circuit through the motor 17 is completed through the front contact 78, the armature of the motor 17, the additive winding 19 of this motor and the subtractive winding 15 of the motor 11.

Further operation of the rheostat after the parallel connection of the motors takes place by movement of the slide element 55 toward the right in Fig. 4 brings the wiping shoe 57 thereof successively into engagement with the ancillary contacts 80 to 86 inclusive, these contacts of the rheostat being connected in parallel respectively to the auxiliary contacts 60 to 66 inclusive. It will be apparent that the operation of the shoe 57 over the contacts 80 to 86 inclusive is effective successively to connect the sections of the grid 53 in series with the shunt fields 3 and 5 and to reduce the excitation thereof so as to increase the speed of the motors now connected in parallel. Continued operation of the slide element 55 toward the right in Fig. 4 will still further cut in resistance in the shunt field circuit to increase the speed to the desired degree consistent with the construction of the motors 11 and 17. It will be understood from the explanation hereinabove given that the subtractive windings 15 and 21 will be effective in cooperation with the additive windings 13 and 19 to secure stable operation of the motors in parallel during the operation thereof in the zone of speed provided by parallel connection of the motors to the supply.

It will be apparent that reverse movement of the slide element 55 toward the left in Fig. 4 first will be effective to reduce the speed of the motors 11 and 17 connected in parallel by cutting out resistance of the grid 53, then to deenergize the relays 70 and 91 to reconnect the motors in series concomitantly with cutting in resistance when the shoe 57 engages the auxiliary contact 66 and then to reduce the speed of the motors thus connected in series by cutting out the resistance until the full shunt field current is restored when the wiping shoe 57 engages the auxiliary contact 59.

Figure 5:
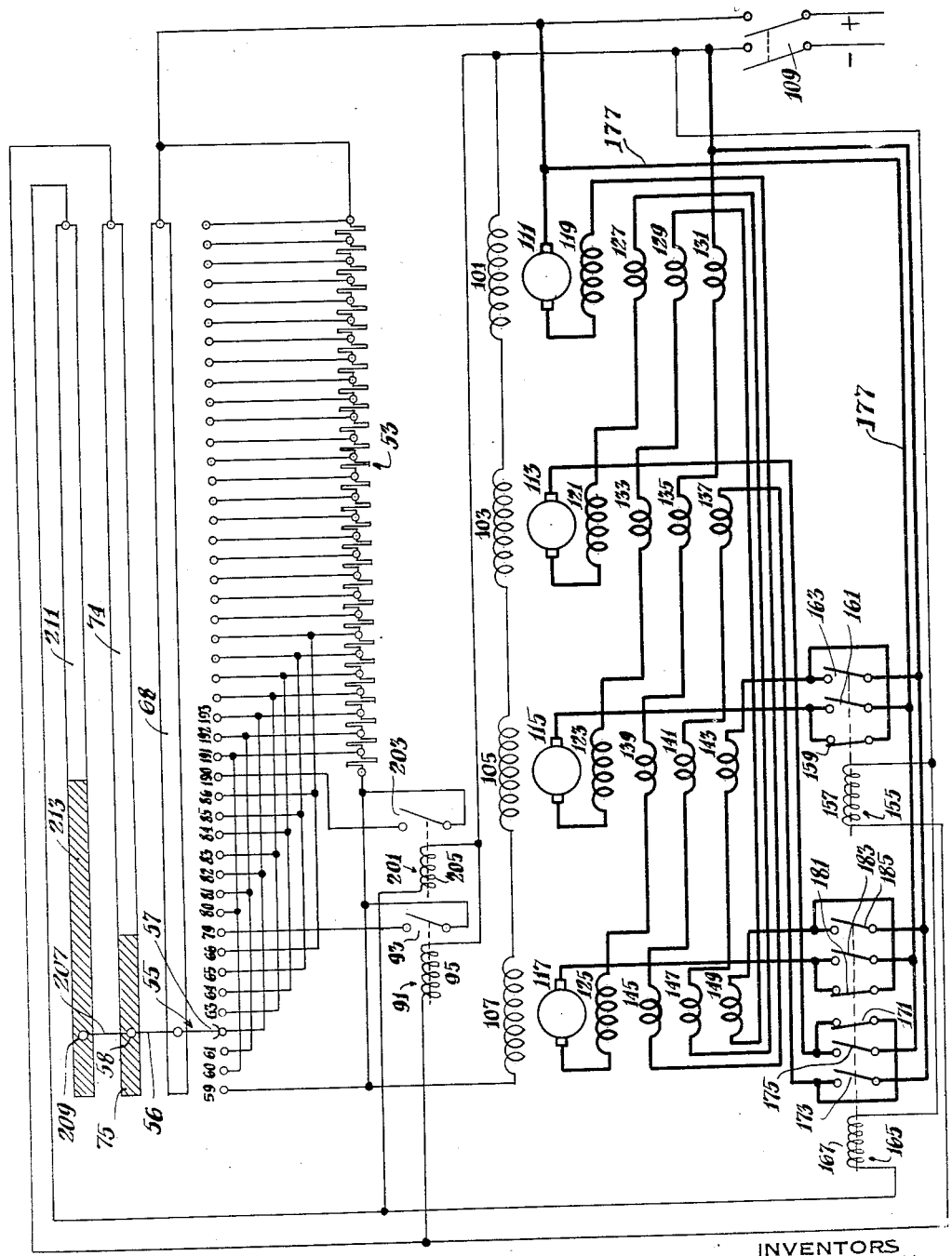
Fig. 5 shows a wiring diagram for four motors connectible in series, in series-parallel and in parallel and the control means therefor.

In Fig. 5 is shown a system of four motors connectible in series, in series-parallel and in parallel by control means constructed in accordance with the invention and adapted to control the speed of the motors in each of three successive zones of speed corresponding to the three schemes of connection. In Fig. 5 the shunt fields 101, 103, 105 and 107 of the four motors are connected in series to a supply controlled by a switch 109 through the grid 53 of the shunt field rheostat. The armatures 111, 113, 115 and 117 of the four motors are connected in series with the series fields or additive windings respectively 119, 121, 123 and 125 of these motors. Associated with the respective motors are the subtractive field windings 127, 129, 131 for the motor 111, the subtractive field windings 133, 135 and 137 of the motor 113, the subtractive field windings 139, 141 and 143 for the motor 115, and the subtractive field windings 145, 147 and 149 of the motor 117. The additive winding 119 of motor 111 is connected in series with the subtractive winding 145 of motor 117, the subtractive winding 141 of the motor 115 and the subtractive winding 137 of the motor 113. The additive winding 121 of the motor 113 is connected in series with the subtractive winding 127 of the motor 111, the subtractive winding 147 of the motor 117 and the subtractive winding 143 of the motor 115. The additive winding 123 of the motor 115 is connected in series with the subtractive winding 133 of the motor 113, the subtractive winding 129 of the motor 111 and the subtractive winding 149 of the motor 117. The additive winding 125 of the motor 117 is connected in series with the subtractive winding 139 of the motor 115, subtractive winding 135 of the motor 113, and subtractive winding 131 of the motor 111. Each of these groups of windings thus connected in series is connectible also with the similar groups of winding of the other motors. These windings as groups may be connected in series or in parallel, or in the intermediate connection in series-parallel to secure the wide range of speed control as above described. This connection of the motors to provide the three zones of speed control is accomplished by the apparatus diagrammatically shown in Fig. 5 in the manner now to be described.

Similar to the control device of Fig. 4 the apparatus of Fig. 5 provides a rheostat having a resistance grid 53, the first auxiliary contact 59 of the rheostat being connected to the terminal of the series field 107 and to the left hand element of the grid 53. The control device of Fig. 5, similar to that of Fig. 4, is provided with a conductor bar 68 along which a slidable contact element 55 is movable from left to right and the reverse in Fig. 5. This slidable element 55 has a wiping shoe 57 for engaging the series of auxiliary contacts 59 to 66 inclusive which are connected to successive sections of the grid 53 of the rheostat. The conductor bar 68 is connected to the opposite side of the supply from that to which the terminal of the shunt field 101 is connected. Engagement of the wiping shoe 57 with a given one of the contacts 60 to 66 is effective to cut into the circuit the sections of the grid 53 to the left of the connection of the given contact as shown in Fig. 5, thereby simultaneously to control the excitation of all of the series connected shunt fields of the motors to increase the speed thereof, for example, from the minimum speed $V_1$ to a speed $V_2 = 2V_1$.

The control device in Fig. 5 also provides a conductor bar 74 in contact with which a contact shoe 58 on the extension 56 of the slidable element 55 may bear as the slide element is moved to the right. In line with the conductor bar 74 is the bar 75 of insulating material upon which the shoe 58 bears when the slide element 55 is operated in engagement with the auxiliary contacts 59 to 66. When the wiping shoe 57 is moved toward the right from its position of engagement with the contact 66 it bridges to the contact 79 of a group of contacts 79 to 86 inclusive which in connection with the apparatus of Fig. 5 will be referred to as ancillary contacts. These contacts are respectively connected in parallel to the joined terminals of the rheostat grid sections to which the auxiliary contacts 59 to 66 are connected. As shown in Fig. 5, the contact 79 is connected to the contact 93 of relay 91 which when closed is effective to short circuit the sections of the grid 53 which successively have been cut in in series with the shunt field coils 101, 103, 105 and 107 by movement of the slide element 55 over the auxiliary contacts 59 to 66. The ancillary contact 79 is so positioned with respect to the joint between the conductor bar 74 and the insulating bar 75 that, as the wiping shoe 57 having bridged to contact 79 is about to leave the auxiliary contact 86, the contact shoe 58 makes contact with the conductor bar 74 to establish the circuit through the relay 91, thereby closing the contact 93. Contact of the shoe 58 with the conductor bar 74 also establishes the circuit through the coil 157 of the relay 155 having back contact 159 and front contacts 161 and 163. Thus, concomitantly with closing of the contact 93 and short circuiting of all the sections of the grid 53 of the rheostat, thus reestablishing the full field excitation of the shunt fields, the relay 155 is effective to open the back contact 159 and close the front contacts 161 and 163.

The circuit through the motors becomes established in series-parallel by this operation of the relay 155. One circuit is completed through the armature 111, series field 119 of the motor 111, subtractive windings 145 of the motor 117, the subtractive winding 141 of the motor 115, subtractive winding 137 of the motor 113, back contact 171, now closed, of a relay 165, then through the armature 113 and series field 121 of the motor 113, subtractive winding 127 of the motor 111, subtractive winding 147 of motor 117 and subtractive winding 143 of the motor 115 and through the front contact 163, now closed, of the relay 155. It will be apparent that the motors 111 and 113 thereby are connected in series. A parallel circuit also is established through the front contact 161 of the relay 155, now closed, through the armature 115 and series field 123 of the motor 115, the subtractive winding 133 of the motor 113, subtractive winding 129 of the motor 111, subtractive winding 149 of the motor 117 to back contact 181 of the relay 165, the armature 117, the series field coil 125 of motor 117, subtractive winding 139 of motor 115, subtractive winding 135 of motor 113 and subtractive winding 131 of the motor 111. It will be apparent that in this parallel circuit the motors 115 and 117 are connected in series and as a group in parallel with the motors 111 and 113. In each of these groups it will be noted a subtractive winding of each of the other motors is connected in series with the series field or additive winding of the given motor. This connection of the motors in series-parallel is maintained during the operation of the rheostat by movement of the shoe 57 of slide element 55 into engagement in succession with the ancillary contacts 80 to 86 inclusive, while the speed of the motor is further increased, for example, from $V_2$ to $V_3 = 2V_2$.

When the wiping shoe 57 is in engagement with the last ancillary contact 86 the sections of the grid 53 utilized for varying the shunt field excitation when the motors were connected in series again are all cut in in series with the shunt fields 101, 103, 105 and 107. As the wiping shoe 57 is adapted to bridge from the last ancillary contact 86 to the first contact 190 of the group of main contacts 190, 191, 192, 193, etc. shown in Fig. 5, as the slide element 55 is further moved toward the right, a circuit will be established through contact 203 of relay 201 when the contact 203 is closed upon energization of the relay coil 205 again to short circuit the grid sections so as to reestablish the full excitation current of the shunt fields.

In order to effect the operation of the relay 201 the slide element 55 is provided with a further extension 207 in the embodiment of Fig. 5, this extension having a second contact shoe 209 adapted to bear upon a second conductor bar 211 which is in alignment with and in abutting relation to an insulating bar 213. The joint between the bars 211 and 213 is so positioned that when the wiping shoe 57 engages with the first main contact 190 and as it is about to leave the last ancillary contact 86 the contact shoe 209 makes contact with the conductor bar 211, thereby to establish a circuit from the supply through the conductor bar 68, the slide element extensions 56 and 207, the contact shoe 209, conductor bar 211 and relay 201.

Also connected in this circuit in parallel with relay 201 is the relay 165 above mentioned. Energization of the relay 165 is effective to open its back contact 171 and to close its front contacts 173 and 175. Such energization of this relay also is effective to open its back contact 181 and close its front contacts 183 and 185. It will be noted that the relay 155 remains energized while the relay 165 is energized since the contact shoe 58 remains in contact with the conductor bar 74 as the slide element 55 moves over contacts 190, 191, 192, etc. of the rheostat. The circuit through the motors now may be traced, the energization of these relays being effective to connect the four motors 111, 113, 115 and 117 in parallel.

Each of the four circuits for these parallelly connected motors, may be traced through the respective motors, their armatures, their additive windings and the subtractive windings of the other motors. That through motor 111 includes its armature and the series or additive winding 119, the subtractive winding 145 of the motor 117, subtractive winding 141 of the motor 115, subtractive winding 137 of the motor 113 and front contact 173 of the relay 165, now closed. The circuit through motor 113 may be traced through the lead 177, the front contact 175 of the relay 165, the armature of the motor 113 and its series field or additive winding 121, the subtractive winding 127 of the motor 111, the subtractive winding 147 of the motor 117, subtractive winding 143 of the motor 115 and front contact 163 of the relay 155, now closed. The circuit through the motor 115 may be traced through the lead 177, front contact 161 of the relay 155, now closed, the armature 115 and the series field or additive winding 123 of this motor, the subtractive winding 133 of the motor 113, subtractive winding 129 of the motor 111, subtractive winding 149 of the motor 117 and front contact 185 of the relay 165, now closed. The circuit through the motor 117 may be traced through the lead 177, front contact 183 of the relay 165, now closed, the armature 117 and the series field or additive winding 125 of the motor 117, subtractive winding 139 of the motor 115, subtractive winding 135 of the motor 113 and subtractive winding 131 of the motor 111.

After the establishment of the circuits through the relays 155 and 165 these relays are maintained energized during the operation of the rheostat to move the slide element 55 toward the right concomitantly cutting in resistance of the rheostat to reduce the field excitation of the shunt fields and thereby to increase the speed of the motors in the two zones of series-parallel and parallel connection of the motors. Further operation of the slide element toward the right over main contacts 190, 192, 193, etc. may be carried out to reduce the field excitation within the limits of the construction of the motors to increase the speed thereof. Reverse movement of the slide element is first effective to reduce the speed by cutting out resistance in the shunt field circuit, then to change the connection from parallel to series-parallel when the contact shoe 209 passes over the joint between the conductor bar 211 and the insulating bar 213. At this point the wiping shoe 57 engages the last ancillary contact 86 and, upon its leaving the first main contact 190, the sections of the grid 53 to the left of that to which the contacts 86 and 66 are connected will be cut into the shunt field circuit. Thereafter further reduction of the speed with the motors connected in series-parallel will occur by cutting out resistance in this shunt field circuit as the slide moves toward the left over the ancillary contacts 86 to 80 inclusive.

When the slide moves to the left of the first main contact 190 the contact shoe 209 leaves the conductor bar 211. Relays 201 and 165 thereby are deenergized. The contact 203 of the relay 201 is opened to remove the short circuit on the sections of the grid connected to the ancillary contacts 80 to 86 effected by engagement of wiping shoe 57 with contact 190. Deenergization of the relay 165 operates the several contacts of this relay to reestablish the series-parallel connection as above described. Similarly, as the shoe leaves the first ancillary contact 79 and engages the last auxiliary contact 66 the relays 91 and 155 are deenergized again to increase the resistance in the shunt field circuit and to establish the connection of the motors in series. When the slide is moved fully to the left over the auxiliary contacts all of the resistance of the rheostat will be cut out and the motors will be reduced to their lowest operating speed, assumed above to be $V_1$.

It will be apparent from the above description in connection with Figs. 4 and 5 that the apparatus of the invention provides for automatic control of the speed of the motors in the several zones of speed which are secured by the series connection of the motors and by their connection in series-parallel and in parallel. The device provides control means automatically effecting change over of the connection from one method of connection to the other concomitantly with change in the conditioning of the rheostat for control of the shunt fields of these motors to secure the range of speed in each zone and therefore a wide total range of speed of the machine driven by the motors.

Because the wiping shoe 57 bridges between the last auxiliary contact 66 and the first ancillary contact 79, Fig. 4, and because as the slide element 55 moves toward the right the contact shoe 58 comes into contact with the conductor bar 74 before the wiping shoe 57 leaves the contact 66, the whole grid 53 is short circuited and a high shunt field current is produced without opening the field circuit. Therefore, no arcing occurs between the shoe 57 and contact 66. Moreover, as the relays 70 and 91, Fig. 4, are connected in parallel the motors become re-connected in parallel from the series connection simultaneously with the increase in the excitation of the shunt field. The switching means actuated by the relay 70, as is customary, may be designed to carry the increased current drawn through the armatures as a result of the parallel connection and to provide for any arcing which may occur due to the opening of the circuit of the motors connected in series. It will be apparent that upon reverse movement of the rheostat the wiping shoe 57 will be brought into contact with the last auxiliary contact 66 before the contact shoe 58 leaves the conductor bar 74. This will reestablish the reduced excitation of the shunt fields as soon as the relay 91 is deenergized as the slide element moves toward the left in Fig. 4 to disengage the shoe 58 from the conductor bar 74 and to disengage the wiping shoe 57 from the first or short circuiting contact 79 of the set of ancillary contacts. No interruption of the shunt field will occur and no arcing will occur at the wiping shoe 57 because the de-energization of relay 91 opens contact 93 before the shoe 57 leaves contact 79. The relay 70 will be simultaneously deenergized to reestablish the series connection of the motors. In the apparatus of Fig. 5 similar action occurs at the moment of passing of the wiping shoe between auxiliary contact 66 and ancillary contact 79 and between ancillary contact 86 and the first main contact 190.

While for clarity in describing the control devices of Figs. 4 and 5 the term "ancillary" has been used to identify the contacts 79 to 86 inclusive to distinguish these contacts from the "auxiliary" contacts 59 to 66 inclusive, it will be understood that in Fig. 4 these "ancillary" contacts are related to the portion of the rheostat to the right thereof as are the "main" contacts 190, 191, 192, 193, etc. in Fig. 5. In the claims, therefore, the word "main" will be understood to include a group of contacts which is adjacent another group which may be termed "auxiliary" or "ancillary" as the case may be.

Figure 6:
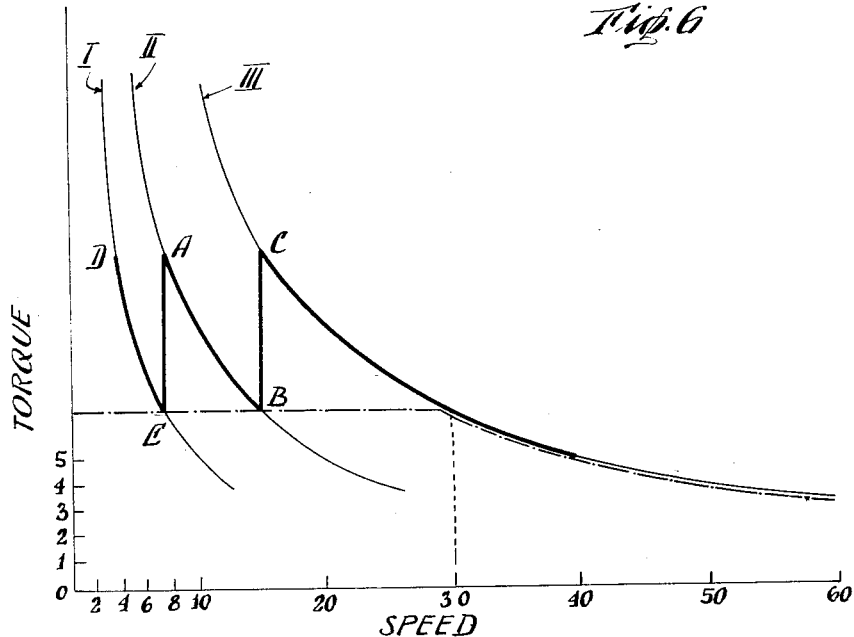
Fig. 6 shows the curves of the speed-torque characteristic for the motor drive of the invention.
Figure 7:
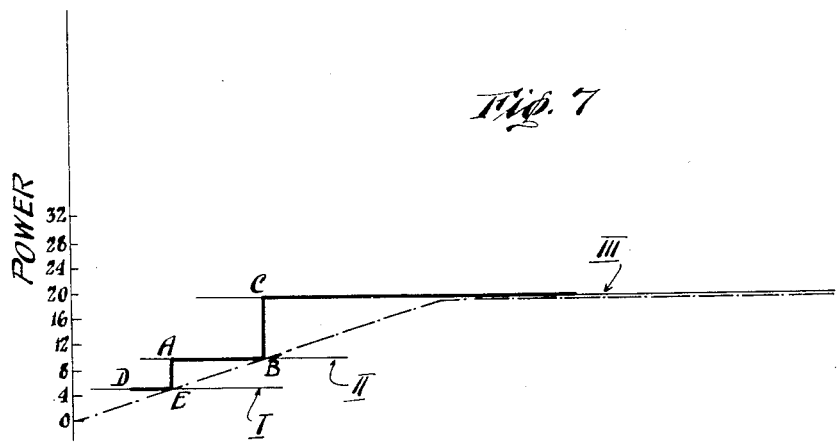
Fig. 7 shows the graph of power and speed corresponding to the characteristic of Fig. 6.

Referring now to Figs. 6 and 7 the operation of the motors connected for operation successively in the three zones as above described is shown in the relations of torque and power to the speed.

In Fig. 6 the curve I represents the speed-torque characteristic of a motor having a capacity one-quarter of that required for driving a given load. Curve II represents the speed-torque characteristic of a motor having a capacity one-half that required for the load. Curve III represents a speed torque characteristic of a motor having a capacity equal to that required for the load. In Fig. 7 the corresponding sections of the stepped graph show the power developed by the respective motors when operating their full load capacities.

If two motors are utilized connectible in series and in parallel as shown in Figs. 1 and 2 and controlled by the control device shown in Fig. 4, each of these motors having a capacity one-half of that of the required load, the speed-torque characteristic may be represented by the curve II it being assumed, for the purposes of the present explanation, that both motors substantially have the same characteristic. As shown in Fig. 6, upon starting these motors when connected in series the speed may be increased with a corresponding decrease in the torque from a point A on curve II to a point B by virtue of the operation of the field rheostat to move the slide member 55 from the contact 59 to the contact 66. In Fig. 7 the power output of the two motors may be represented by the sections of the stepped graph II between the points A and B for the same increase in speed.

When the slide 55 has been moved to the position where the wiping shoe 57 thereof is in engagement with the contact 79 and the contact shoe 58 makes contact with conductor bar 74 the torque is increased, as shown in Fig. 6, to the point C on the curve III, with corresponding increase in the power output of the motors when these motors are connected in parallel by the operation of the relay 70, as described in connection with Fig. 4. The motors thus connected in parallel will operate along the speed-torque characteristic curve III, Fig. 6, upon further movement of the slide element 55 to the right over contacts 80, 81, 82, etc. in Fig. 4, until the desired speed is reached. When the rheostat is set to control the motors to run at this speed stable operation thereof in parallel is secured by virtue of the subtractive windings in cooperation with the series field or additive windings as above described. The power output corresponding to the change in torque with increase of speed along the curve III in Fig. 6 is represented by the horizontal line extending toward the right of the point C in Fig. 7.

If four motors are used connected first in series then in series-parallel then in parallel under control of apparatus as described in connection with Fig. 5, the speed-torque characteristic of the individual motors may be represented by the curve I and each of the four motors connected in series will operate along this curve with decrease of torque and increase of speed from a point D to a point E upon operation of the slide 55 in Fig. 5 to move the wiping contact 57 from the contact 59 to the contact 66. Upon engagement of the wiping shoe 57 with the contact 79 in Fig. 5 the contact shoe 58 makes contact with the conductor bar 74, and the energization of the relays 91 and 155 will establish the series-parallel connection of the motors and reestablish the full energization of the shunt fields for operation in this second zone of series-parallel connection as the slide is moved from contact 79 to contact 86 in Fig. 5. The torque will increase to the point A on curve II and then the speed of the motors thus connected in series-parallel will rise along the curve II from the point A to the point B, whereupon the wiping shoe 57 of the slide 55 engages the contact 190 and the contact shoe 209 makes contact with the conductor bar 211, thus energizing the relays 201 and 165 to establish the parallel connection of the four motors and to reestablish the full shunt field excitation. The torque will be increased to the point C and the speed thereafter will rise along the curve III, as shown in Fig. 6, to a speed determined by the position of the rheostat slide 55 toward the right of the contact 190 as above described. The corresponding increase in power output of the motors connected in series-parallel and then in parallel are shown for the section A—B of line II and that to the right of point C of line III of the graph in Fig. 7, corresponding change points carrying the same letters A, B and C in these two figures.

It will be apparent that reverse movement of the slide element 55, that is toward the left in Figs. 4 and 5, will effect reduction of speed and corresponding changes in the torque and in the power as shown in Figs. 6 and 7.

It will be understood that although a single line has been shown for the characteristic curves I, II and III the actual characteristics for the individual motors may depart to one side or the other of the lines shown because of the differences in construction, magnetic characteristics, resistances or other conditions. The compensation secured by virtue of the subtractive windings maintains a stable or balanced condition of operation of the motors, however, and variation of the speed and corresponding variation of torque and power substantially is determined by the control effected by the shunt field rheostat in the manner described in connection with Figs. 4 and 5. The curves of Figs. 6 and 7, therefore, indicate substantially the result obtained by the use of motors connected in series, series-parallel and parallel in accordance with the invention.

In Figs. 6 and 7 there is shown also, for the purpose of comparison, the characteristic curve of the power output motor of a Leonard unit. This motor is assumed, in the example shown in Figs. 6 and 7, to have the characteristic shown by the curve III. The Leonard unit will produce a substantially constant torque with increased speed along the dot and dash line of Fig. 6 and an increased power output along the dot and dash line of Fig. 7 until the speed is reached where the torque line intersects the characteristic curve III, Fig. 6, and the inclined line intersects the full power output line, Fig. 7. With further increase of speed by control of the shunt field rheostat of the output motor of the Leonard unit, the torque will reduce along the curve III, Fig. 6. The power output will remain substantially constant as shown by the horizontal dot and dash line of Fig. 7.

It will be apparent from the above description and consideration of the curves of Figs. 6 and 7 that the torque available for driving the machine up to full power operation by means of the motors arranged in accordance with the invention during the operation thereof in the plurality of successive zones of speed is substantially greater than that for a Leonard unit having the same capacity of the output motor as is provided by the plurality of motors ultimately connected in parallel for operation in the highest zone of speed. It will also be apparent from these curves that a motor of much larger capacity is necessary in the Leonard unit for securing the requisite power at highest speed than that of the individual motors of the system of the invention. Although the Leonard unit secures a wide range of speed and constant torque while bringing the motor up to speed by control of the field of the generator of the unit, with the apparatus of the invention and particularly with the control device which provides automatic control of the shunt field and change of the connections of the motors in the passing from one zone of speed to the other, the range of speed secured equals or exceeds that of the Leonard unit. As the size or capacity of the individual motors is a fraction of that of the Leonard motor and of the generator necessary to supply it, the motors of the invention may be controlled within a practical range of the speed obtained by variation of their shunt fields in each of the zones of speed. In each of these zones, therefore, they approximate closer to the conditions for efficient as well as stable operation than would be the case if a single motor were used for various conditions of torque and load developed concomitantly with change of speed. By providing a control device constructed in accordance with the invention a simple, smoothly acting control is secured which is adapted for starting the motors and increasing the speed to any desired speed and for maintaining these motors in operation at such speed or, again, for varying the speed for different conditions of operation. Such control means and the operation of the motors controlled thereby is particularly suitable for the control and drive of machine tools where wide variation in speed with constant or varying torque is required.

Within the scope of the invention modifications of the particular means may be adopted to carry out the functions of the control device for effecting the connection of the motors in series, in series-parallel and parallel in the different zones of speed. The rheostat may be constructed in different forms while providing the feature of initially effecting high field excitation upon connection of the motors in series, reducing this excitation over a predetermined range by operation of the rheostat and, upon reconnection of the motors in series-parallel, restoring the full field excitation, this cycle being repeated upon connection of the motors in parallel. The high shunt field excitation is restored at the moment of change of connection so that the effect of connecting the motors in series-parallel or in parallel which tends to increase the speed is first opposed by the effect of the increased excitation of the shunt field tending to reduce the speed. As the shunt field resistance is cut in, however, the speed is increased until a second change in the connection, that is the final parallel connection, is brought about simultaneously with again restoring the excitation of the shunt field. The opposing effect of this increased excitation upon the tendency to increase the speed due to the connection of the motors in parallel again occurs. By this action a smooth change from one zone of operation to the other is secured. The operation of the rheostat of the control in the reverse direction similarly produces smooth reduction of the speed of the motors.

Modifications of the particular construction may be adopted to provide the requisite mechanical and electrical characteristics of the control device to suit the load to be carried by the motors, current capacities of their shunt and series fields and the particular type of machine, such as a machine tool, for which the control is to be used. All such modifications are understood to be within the scope of the appended claims.

We claim:

1. In a direct current motor drive, the combination with a plurality of direct current motors each having an armature and a shunt field winding and an additive series field winding, and at least one subtractive series field winding associated with each motor, the number of subtractive windings associated with each motor being one less than the number of motors, the additive windings of each motor being connected in series with a subtractive winding of each of the other motors, of switch means connected in circuit with said armatures and said additive windings and said subtractive windings of said motors for initially connecting the armatures of said motors in series and with all of the additive windings in series and all of the subtractive windings of the motors in series, a rheostat connected in circuit with all of said shunt field windings and having a movable member operatively connected to said switch means and operable to produce shunt field excitation of said motors concomitantly with operation of said switch means to connect said armatures of said motors in series and operable thereafter to cut in resistance of said rheostat to reduce the excitation of the shunt fields simultaneously to increase the speed of said motors connected in series to a predetermined speed, said switch means cooperating with said movable member of said rheostat so as to be effective upon the attainment of said predetermined speed to connect the armatures of said motors in parallel and simultaneously to cut out the resistance cut in during series operation to increase the excitation of the shunt fields of said motors connected in parallel, said movable member of said rheostat being operable thereafter to cut in resistance to reduce the shunt field excitation of said motors connected in parallel further to increase the speed thereof.

2. In a direct current motor drive, the combination with two direct current motors each having an armature and a shunt field winding and an additive series field winding, and a subtractive series field winding associated with each motor and connected in series with the additive winding of the other motor, of a control device connected in the armature circuit of said motors for initially connecting the armatures of said motors in series for operation in a range of speed determined by the excitation of the shunt fields thereof and operable to change the connection of said armatures of the motors from series to parallel, a rheostat connected in circuit with said shunt field windings and cooperating with said control device to produce shunt field excitation of said motors upon said initial connection of said motors in series and operable thereafter to reduce said excitation to increase the speed of said motors to a predetermined speed, and means cooperating with said rheostat and said control device and effective upon operation of said rheostat to produce said predetermined speed and upon connection of said armatures of said motors in parallel first to increase the shunt field excitation thereof and thereafter upon continued operation of the rheostat to reduce the shunt field excitation of said motors connected in parallel further to increase the speed thereof.

3. In a direct current motor drive, the combination with four direct current motors each having an armature and a shunt field winding and an additive series field winding, and three subtractive series field windings associated with each motor, the additive winding of each motor being connected in series with a subtractive winding of each of the other three motors which also are connected in series with each other, of a control device connected in circuit with said armatures for initially connecting said armatures of said motors in series for operation in a range of speed determined by the excitation of the shunt fields thereof and operable to change the connection of the motors from series to series-parallel, a rheostat connected in circuit with said shunt field windings and cooperating with said control device to produce shunt field excitation of said motors upon said initial connection of said motors in series and operable thereafter to reduce the excitation to increase the speed of said motors to a predetermined speed, means cooperating with said rheostat and said control device and effective upon operation of said rheostat to produce said predetermined speed and upon connection of said armatures of said motors in series-parallel first to increase the shunt field excitation and thereafter upon continued operation of the rheostat to reduce the shunt field excitation of said motors connected in series-parallel further to increase the speed thereof, means cooperating with said rheostat and said control device and effective upon operation of said rheostat to produce a predetermined speed of the motors with their armatures connected in series-parallel to change the connection of said armatures from series-parallel to parallel, and means cooperating with said rheostat and said control device and effective upon connection of said armatures of said motors in parallel first to increase the shunt field excitation and thereafter upon continued operation of the rheostat to reduce the shunt field excitation of said motors connected in parallel further to increase the speed thereof.

4. In a direct current motor drive, the combination with a plurality of direct current motors each having a shunt field winding, of switch means connected in circuit with the armatures of said motors and constructed so as to be operable initially for connecting said armatures in series, a rheostat connected in circuit with said shunt field windings and having a movable member operatively connected to said switch means and operable to produce shunt field excitation of said motors concomitantly with operation of said switch means to connect said armatures of said motors in series, said movable member being operable thereafter to cut in resistance of said rheostat to reduce the excitation of said shunt fields to increase the speed of said motors connected in series to a predetermined speed, said switch means being operable to connect said armatures of said motors in parallel and cooperating with said movable member of said rheostat so as to effect such connection of said armatures in parallel upon operation of said rheostat to produce said predetermined speed of said motors, and means operatively connected to said rheostat and actuated upon operation of said movable member to produce said predetermined speed and simultaneously with connection of said armatures of said motors in parallel for shortcircuiting the resistance of said rheostat cut in during connection of said armatures in series so as to increase the excitation of said shunt fields of said motors connected in parallel, said movable member of said rheostat being operable thereafter to remove said short circuit and again to cut in resistance to reduce the shunt field excitation of said motors connected in parallel further to increase the speed thereof.

5. In a direct current motor drive, the combination as defined in claim 4 which comprises a relay controlled by said movable member so as to be energized upon movement of said movable member to the position for attainment of said predetermined speed of said motors connected in series to operate a contact of said relay connected to short circuit the resistance of said rheostat cut in by the operation of said member during connection of said motors in series, and a relay controlled by said movable member so as to be energized upon movement of said movable member to the position for attainment of said speed of said motors connected in series for operating said switch means to change the connection of said motors from series to parallel.

6. In a direct current motor drive, the combination as defined in claim 4 which comprises a relay controlled by said movable member of said rheostat so as to be energized upon movement of said movable member to the position for attainment of said predetermined speed of said motors connected in series and effective to operate a contact of said relay connected to short circuit the resistance of said rheostat cut in by the operation of said member during operation of said motors in series and effective concomitantly to operate said switch means to change the connection of the armatures of said motors from series to parallel.

7. In a device for control of the speed of direct current motors, the combination with a rheostat having a plurality of resistor grid sections connected in series and having a plurality of main contacts respectively connected to the joined terminals of adjacent grid sections of the rheostat which are connected in series, and a movable member of the rheostat having a wiping shoe adapted to bridge between adjacent contacts of said rheostat and to be moved in succession thereover, of a set of auxiliary contacts respectively connected in parallel to corresponding main contacts of said rheostat and arranged for movement of the wiping shoe of said movable member thereover in succession in the same order as said main contacts with respect to their connections to said grid sections and in successive relation as a group to the group of rheostat main contacts, a contact shoe carried by said movable member of said rheostat, and a conductor bar arranged for contact of said contact shoe therewith as said movable member is moved over said main rheostat contacts, said conductor bar being so arranged with respect to said group of auxiliary contacts and said group of main rheostat contacts that said contact shoe makes and leaves contact with said conductor bar substantially when said wiping shoe of said movable member bridges between the last contact of said auxiliary set and the first main contact of said rheostat.

8. In a device for control of the speed of direct current motors, the combination as defined in claim 7 which comprises a relay having a contact electrically connected to the first main contact of said rheostat and to the rheostat grid so as to be effective upon energization of said relay to short circuit the grid sections of said rheostat cut in by operation of said movable member over said auxiliary contacts substantially when said wiping shoe bridges between the last contact of said auxiliary set and said first main contact of said rheostat.

9. In a device for control of the speed of direct current motors, the combination as defined in claim 7 which comprises a relay having a contact electrically connected to the first main contact of said rheostat and to the rheostat grid so as to be effective upon energization of said relay to short circuit the grid sections of said rheostat cut in by operation of said movable member over said auxiliary contacts substantially when said wiping shoe bridges between the last contact of said auxiliary set and the first main contact of said rheostat, and a relay connected in parallel with said first relay and effective upon energization thereof for operating switch means for a motor control circuit.

10. In a direct current motor drive, the combination with a plurality of direct current motors each having a shunt field winding, of switch means connected in circuit with the armatures of said motors and constructed so as to be operable alternatively to effect a plurality of different connections of said armatures with each other, controlling means connected to said switch means for effecting operation thereof, a rheostat having a plurality of resistor elements connected in series, a group of main contacts respectively connected to the joined terminals of adjacent elements which are connected in series with each other, said series connected resistor elements being connected in circuit with said shunt field windings of said motors, a plurality of groups of auxiliary contacts, said auxiliary contacts in each group respectively being connected in parallel to said joined terminals of adjacent resistor elements to which the corresponding main contacts of said rheostat are connected, a movable member of said rheostat having a wiping shoe, said main and said auxiliary contacts being arranged for engagement in succession in each group and in one group after the other by said wiping shoe of said movable member and so that said wiping shoe bridges successively between the adjacent contacts of each group and between adjacent end contacts of adjacent groups to increase the resistance in each group during the movement of the wiping shoe over the respective groups in a given direction and to decrease the resistance in each group during reverse movement of the wiping shoe over the respective groups, contact shoes equal in number to the number of groups of auxiliary contacts and carried by said movable member of said rheostat, and conductor bars electrically connected to said controlling means and arranged for contact of said respective contact shoes therewith as said movable member is moved over said group of contacts, said conductor bars being so arranged with respect to said groups of main and auxiliary contacts that each contact shoe makes and leaves contact with its conductor bar substantially when said wiping shoe of said movable member bridges between the end contact of a given group and the adjacent end contact of the adjacent group of said consecutively arranged groups of main and auxiliary contacts, said contact shoe thereby operating said controlling means to effect change in said connection of said armatures simultaneously with change of said wiping shoe from operation over said given group of contacts to operation over the adjacent group of contacts, whereby said rheostat is effective to control the speed of said motors in each of said different connections of the armatures thereof.

11. In a direct current motor drive, the combination as defined in claim 10 in which shortcircuiting contacts are provided in the respective connections between said joined terminals of said resistor elements and the respective first contacts of said groups which are adjacent the last contacts of the preceding groups in the increasing order of the rheostat resistance as said movable member moves in said given direction thereover, said shortcircuiting contacts being adapted to be actuated by the operation of said movable member so as to be closed when said wiping shoe is in engagement with the first contact of a given group of said rheostat contacts and is leaving the last contact of the preceding group and so as to be opened when said wiping shoe is in engagement with said last contact and is leaving said first contact when said movable member is moved in the reverse direction.

12. In a direct current motor drive, the combination as defined in claim 11 which comprises relay coils for operating said shortcircuiting contacts, said relay coils being respectively electrically connected to said controlling means so as to be energized to close said shortcircuiting contacts when said wiping shoe is in engagement with the first contact of a given group of said rheostat contacts and is leaving the last contact of the preceding group of contacts in said given direction of movement of said movable member and so as to be deenergized to open said shortcircuiting contacts when said wiping shoe is in engagement with said last contact of said preceding group of rheostat contacts and is leaving said first contact of said given group of contacts when said movable member is moved in the reverse direction.

13. In a direct current motor drive, the combination with a plurality of direct current motors each having a shunt field winding, of a switch means connected in circuit with the armatures of said motors and constructed so as to be operable to a plurality of positions to connect said armatures of said motors respectively in series and in parallel, a rheostat connected in circuit with said shunt field windings and operable to increase and decrease the shunt field excitation of said motors, means cooperating with said switch means and said rheostat for effecting connection of the armatures of said motors in series when said rheostat is in position to determine a high excitation of said shunt fields of said motors, said rheostat thereafter being operable to reduce the excitation of said shunt fields of said motors to increase the speed thereof to a position to determine a predetermined speed, means also cooperating with said rheostat and said switch means to change the connection of said armatures of said motors from series to parallel when said rheostat is in said position to determine said predetermined speed, and means cooperating with said rheostat in said position thereof determining said predetermined speed to reestablish a high excitation of said shunt fields and to provide for operation of said rheostat thereafter to reduce said excitation of said shunt fields further to increase the speed of said motors.

14. In a direct current motor drive, the combination with two direct current motors each having an armature, a shunt field winding, an additive series field winding, and a subtractive field winding associated with each motor, said additive winding of each motor being connected in series with the subtractive winding of the other motor, of a control device connected in circuit with the armatures of said motors for initially connecting the armatures of said motors in series for operation in a first range of speed determined by the excitation of the shunt fields thereof, the highest speed of said first range being twice the lowest speed thereof, means connected in circuit with said shunt field windings and cooperating with said control device to produce shunt field excitation of said motors upon said initial connection of said motors in series and operable thereafter to reduce said excitation to increase the speed of said motors connected in series throughout said first range, said control device and said means upon operation of said means to produce said highest speed of said first range cooperating to connect said motors in parallel and concomitantly to increase the shunt field excitation of said motors connected in parallel to the value corresponding to the lowest speed in said first range, said means being operable thereafter to reduce the shunt field excitation of said motors connected in parallel to increase the speed thereof in a second range of speed from said highest speed of said first range.

15. In a direct current motor drive, the combination with four direct current motors each having an armature, a shunt field winding, an additive series field winding, and three subtractive field windings associated with each motor, said additive windings of each motor being connected in series with the subtractive windings of the other motors, of a control device connected in circuit with the armatures of said motors for initially connecting the armatures of said motors in series for operation in a first range of speed determined by the excitation of the shunt fields thereof, the highest speed of said first range being twice the lowest speed thereof, means connected in circuit with said shunt field windings and cooperating with said control device to produce shunt field excitation of said motors upon said initial connection of said motors in series and operable thereafter to reduce said excitation to increase the speed of said motors connected in series throughout said first range, said control device and said means upon operation of said means to produce said highest speed of said first range cooperating to connect said motors in series-parallel and concomitantly to increase the shunt field excitation of said motors connected in series-parallel to the value corresponding to the lowest speed of said first range, said means being operable thereafter to reduce the shunt field excitation of said motors connected in series-parallel to increase the speed thereof throughout a second range of speed from said highest speed of said first range to a speed twice said highest speed of said first range, said control device and said means upon operation of said means to produce said highest speed of said second range also cooperating to connect said motors in parallel and concomitantly to increase the shunt field excitation of said motors connected in parallel to the value corresponding to the lowest speed of said first range, said means being operable thereafter to reduce the shunt field excitation of said motors connected in parallel to increase the speed thereof in a third range of speed from the highest speed of said second range.

GEORGES GABRIEL MOZZANINI.
VICTOR PAUL LEBERTRE.

REFERENCES CITED

The following references are of record in the file of this patent:

UNITED STATES PATENTS

| Number | Name | Date |
|---|---|---|
| 708,960 | Henry | Sept. 9, 1902 |
| 865,812 | Powell | Sept. 10, 1907 |
| 1,003,926 | Leonard | Sept. 19, 1911 |
| 1,803,676 | Powell | May 5, 1931 |
| 2,182,631 | Kenyon | Dec. 5, 1939 |
| 2,195,766 | Coorcoulas | Apr. 2, 1940 |
| 2,217,432 | Cook | Oct. 8, 1940 |